US011443691B2

(12) United States Patent
Cho et al.

(10) Patent No.: US 11,443,691 B2
(45) Date of Patent: Sep. 13, 2022

(54) ELECTROLUMINESCENT DISPLAY DEVICE AND METHOD FOR DRIVING THE SAME

(71) Applicant: LG DISPLAY CO., LTD., Seoul (KR)

(72) Inventors: Minsu Cho, Paju-si (KR); Jaehyuk Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/769,020

(22) PCT Filed: Sep. 14, 2018

(86) PCT No.: PCT/KR2018/010805
§ 371 (c)(1),
(2) Date: Jun. 2, 2020

(87) PCT Pub. No.: WO2019/132177
PCT Pub. Date: Jul. 4, 2019

(65) Prior Publication Data

US 2021/0225275 A1 Jul. 22, 2021

(30) Foreign Application Priority Data

Dec. 28, 2017 (KR) ........................ 10-2017-0182621

(51) Int. Cl.
*G06F 3/00* (2006.01)
*G09G 3/3225* (2016.01)
*G09G 3/3275* (2016.01)

(52) U.S. Cl.
CPC ......... *G09G 3/3225* (2013.01); *G09G 3/3275* (2013.01); *G09G 2320/02* (2013.01); *G09G 2320/041* (2013.01); *G09G 2330/028* (2013.01)

(58) Field of Classification Search
None
See application file for complete search history.

(56) References Cited

U.S. PATENT DOCUMENTS

2008/0100227 A1 5/2008 Iwabuchi et al.
2013/0147783 A1* 6/2013 Yamauchi ........... H01L 27/1255 345/212
2015/0364089 A1* 12/2015 Pyo ...................... G09G 3/3258 345/77
2016/0379569 A1 12/2016 Lee et al.
2017/0270867 A1 9/2017 Zhu et al.
2017/0278457 A1 9/2017 Zhu et al.
2017/0365218 A1* 12/2017 Jeong .................. G09G 3/3225

FOREIGN PATENT DOCUMENTS

KR 10-2011-0030886 A 3/2011
KR 10-2015-0142830 A 12/2015

* cited by examiner

*Primary Examiner* — Michael A Faragalla
(74) *Attorney, Agent, or Firm* — Birch, Stewart, Kolasch & Birch, LLP

(57) ABSTRACT

Disclosed is an electroluminescent display device including a display panel, a power supply unit, and a data driver. The display panel includes a subpixel for displaying an image. The power supply unit supplies a positive voltage and a negative voltage to the display panel. The data driver supplies a first initialization voltage and a second initialization voltage to the display panel, as well as a data voltage, and at least one of the first initialization voltage and the second initialization voltage is varied.

17 Claims, 7 Drawing Sheets

[Fig. 3]
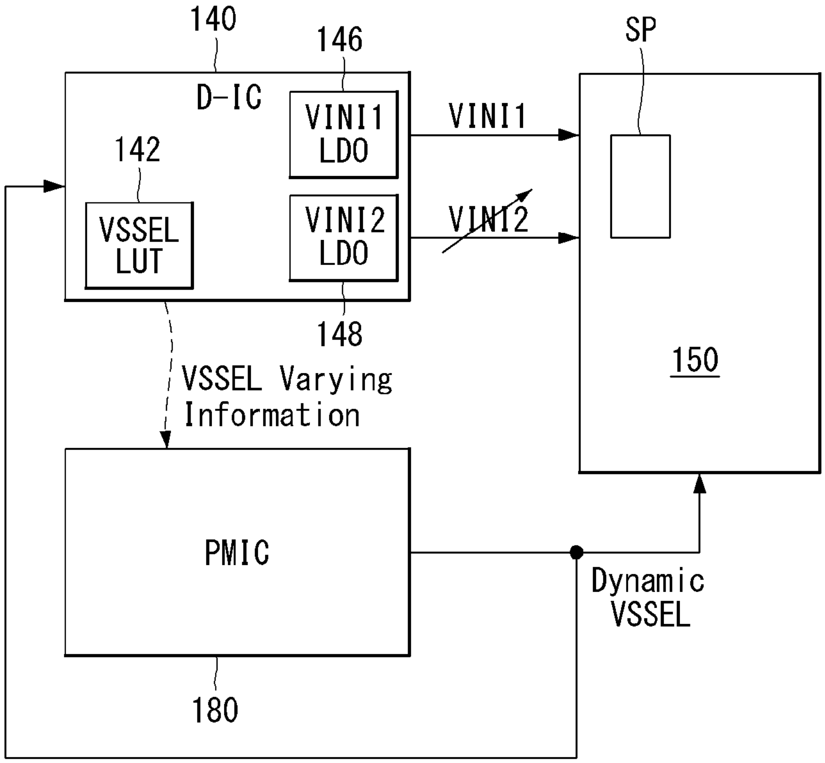
[Fig. 4]
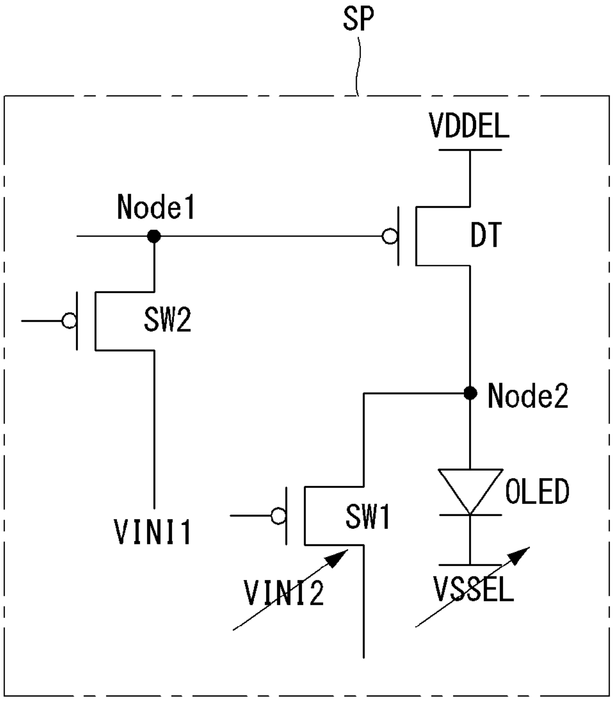

[Fig. 5]
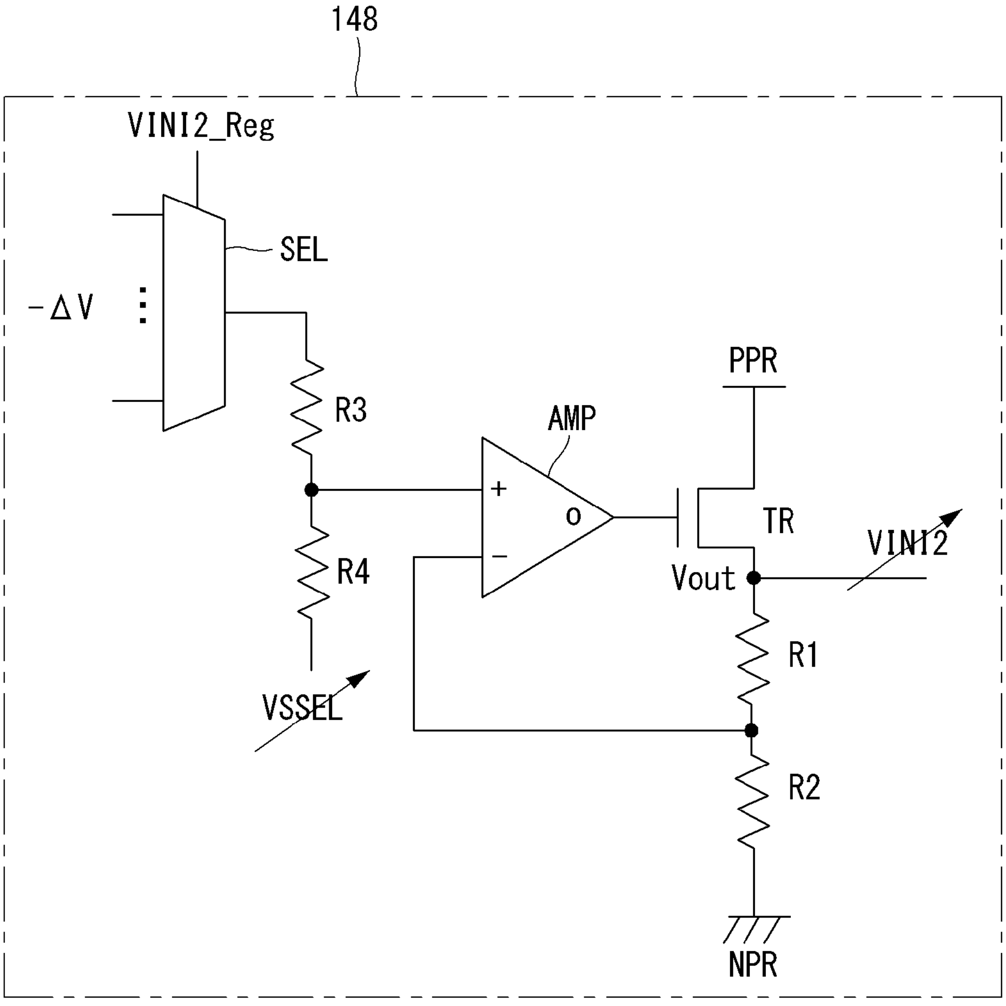

[Fig. 6]
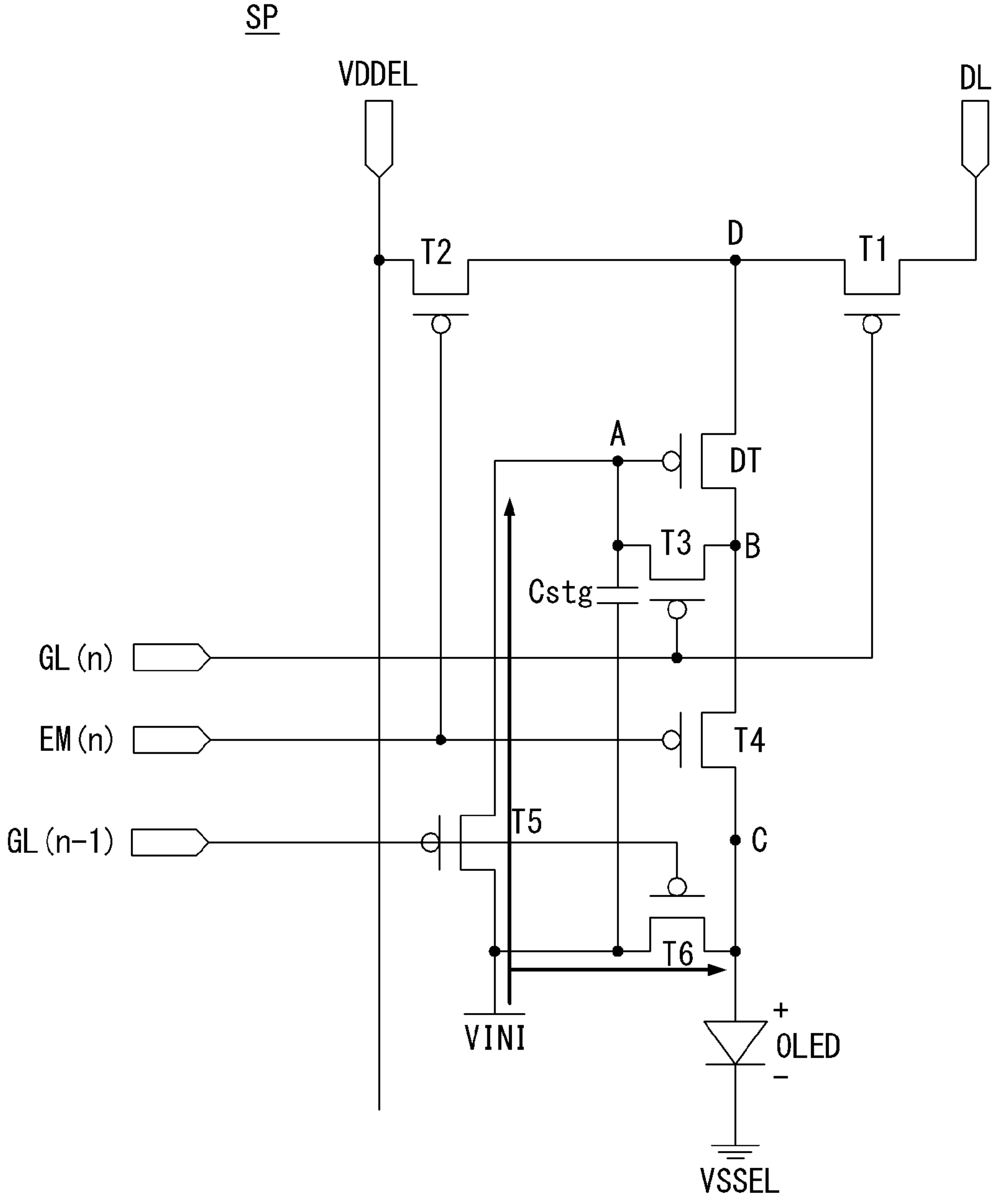

[Fig. 7]
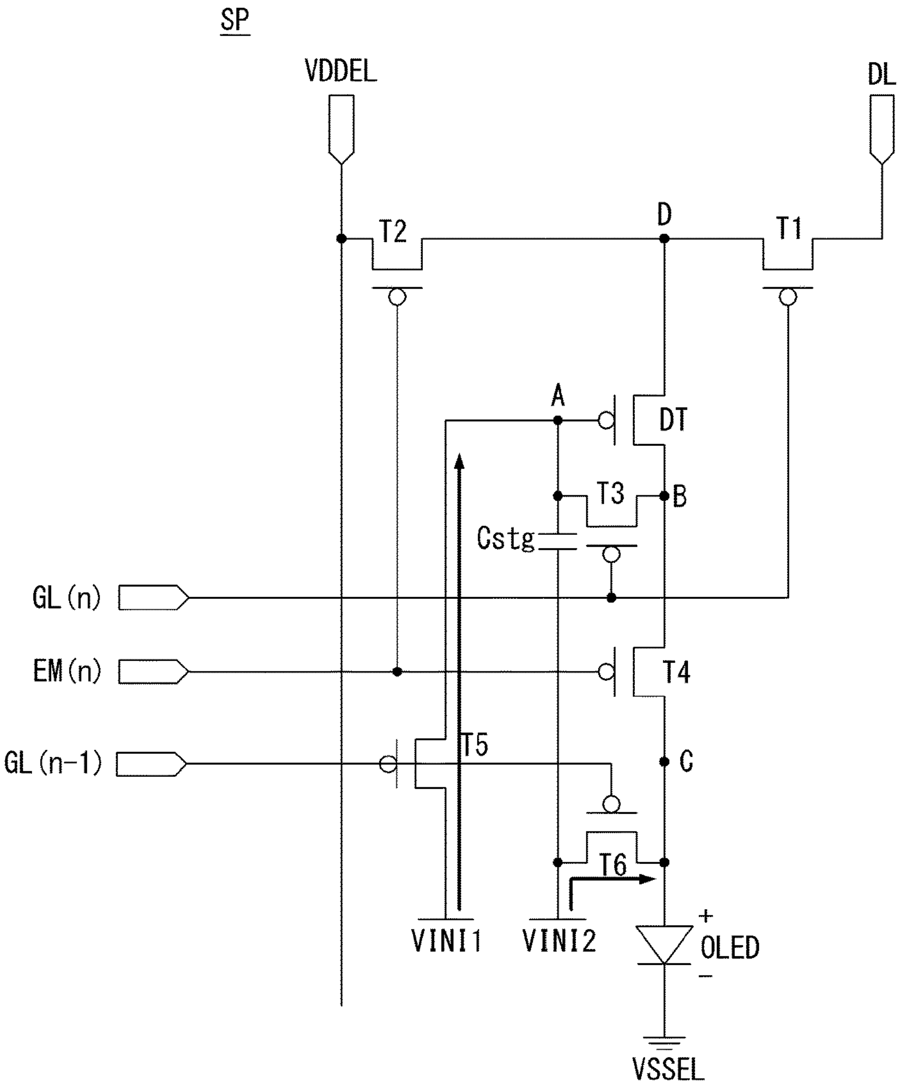
[Fig. 8]
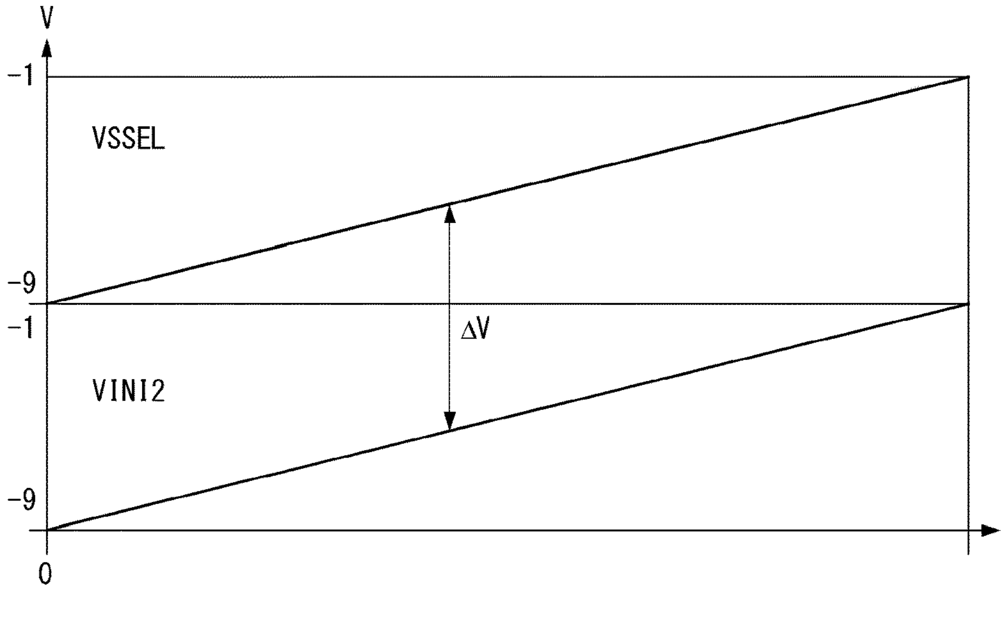

[Fig. 9]
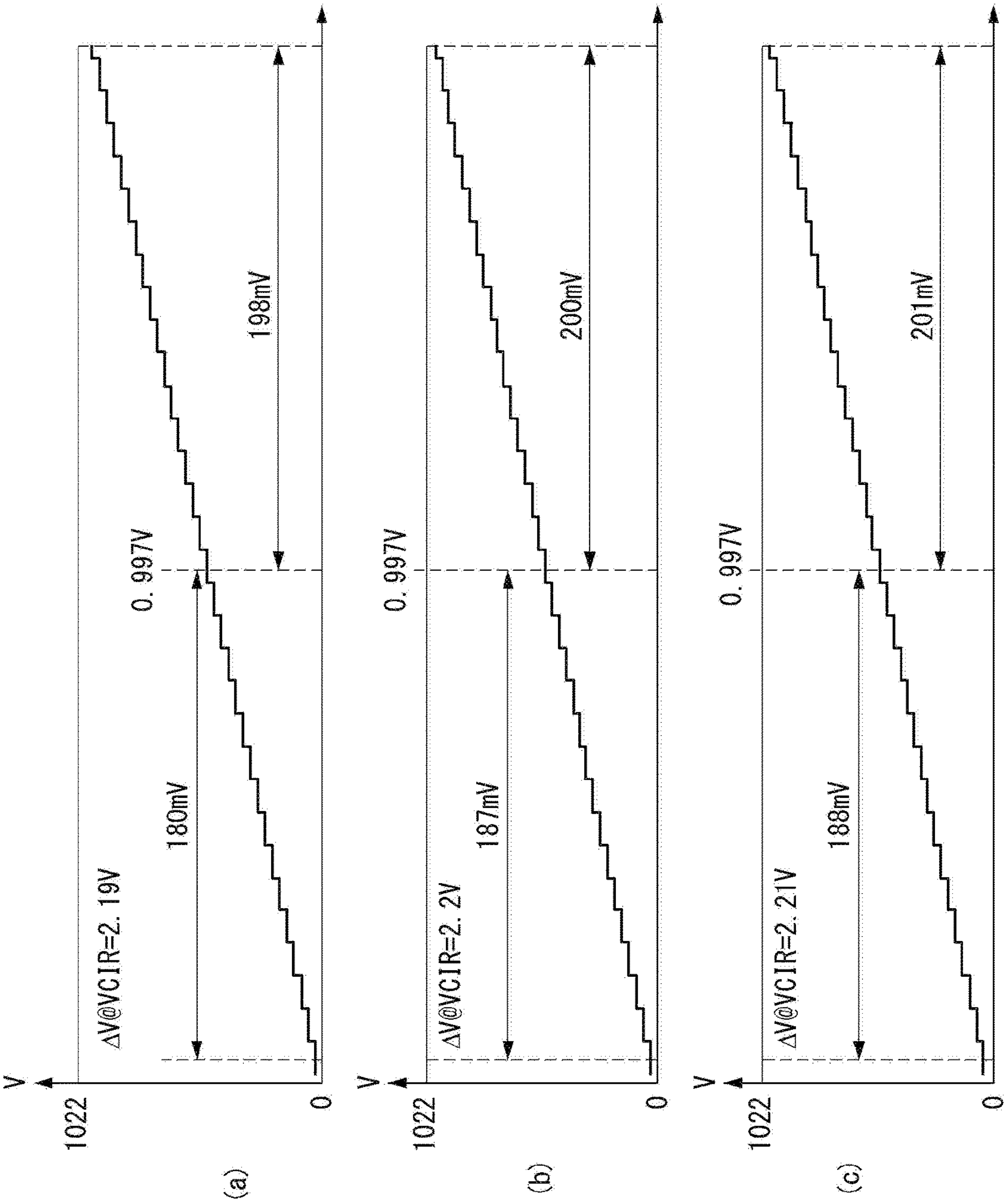

[Fig. 10]
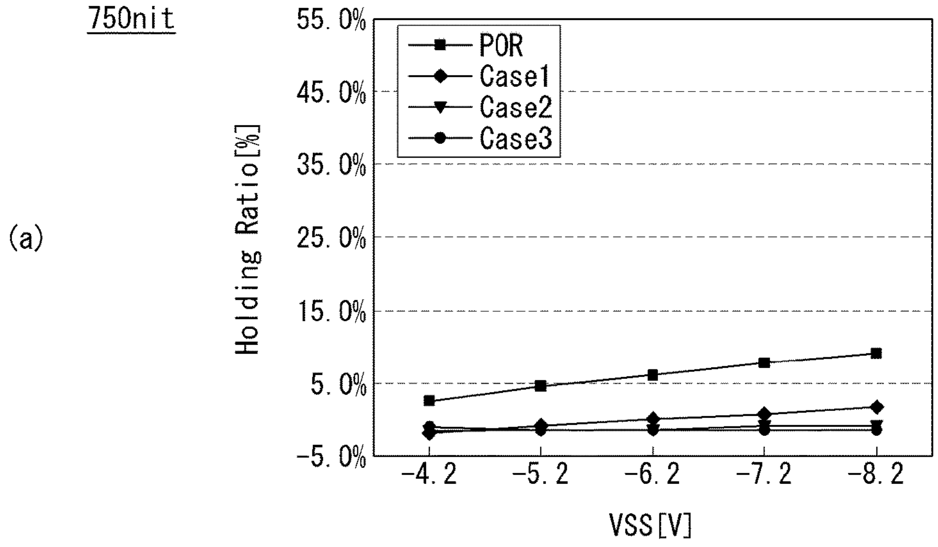
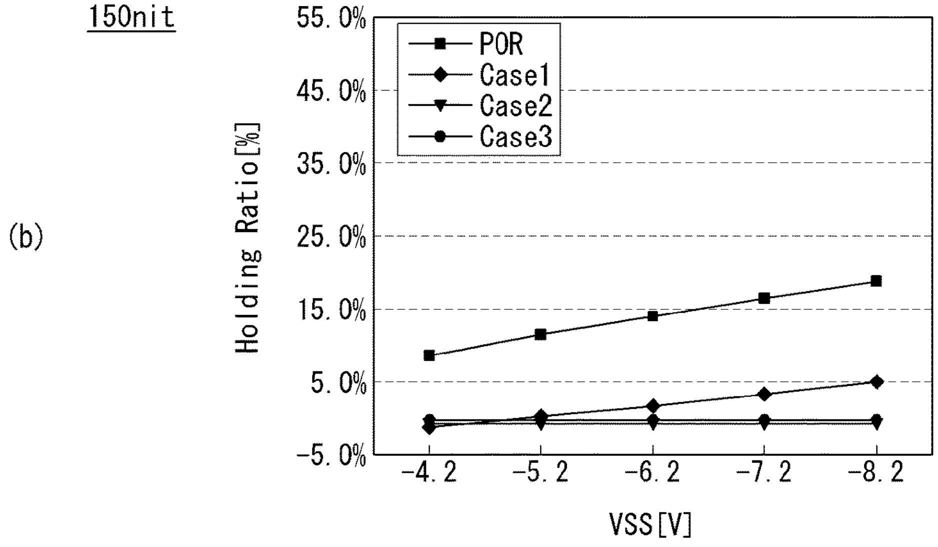
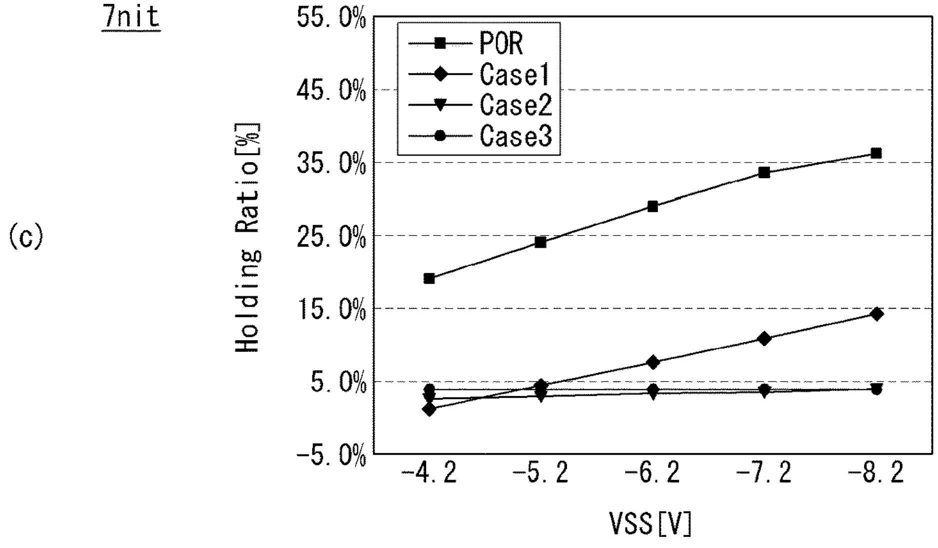

ELECTROLUMINESCENT DISPLAY DEVICE AND METHOD FOR DRIVING THE SAME

CROSS REFERENCE TO RELATED APPLICATIONS

This application is the National Phase of PCT/KR2018/010805 filed on Sep. 14, 2018, which claims priority under 35 U.S.C. § 119(a) to Patent Application No. 10-2017-0182621 filed in Republic of Korea on Dec. 28, 2017, all of these applications are hereby expressly incorporated by reference into the present application.

TECHNICAL FIELD

The present disclosure relates to an electroluminescent display device and a method for driving the same.

BACKGROUND ART

As information technologies are advancing, there are increasing demands for a display device that is a means for connecting a user to information. Accordingly, various types of display device, such as an electroluminescent display device a Liquid Crystal Display (LCD), and a plasma display device, are used.

A display device includes a display panel having a plurality of subpixels, a driver for driving the display panel, and a power supply unit for supplying power to the display panel. The driver includes a scan driver for supplying a scan signal (or a gate signal) to the display panel, and a data driver for supplying a data signal to the display panel.

DISCLOSURE OF INVENTION

Technical Problem

The electroluminescent display device is able to display an image in a manner in which an organic light emitting diode (OLED) of a selected pixel emits light when a scan signal, a data signal, or the like is supplied to subpixels. The OLED is implemented based on an organic material or an inorganic material.

The electroluminescent display device has a problem that the characteristics of the display panel are changed according to the temperature, and the brightness thereof changes.

Solution to Problem

To solve the above problem, the present disclosure forms a voltage difference as much as required for initializing the OLED so that occurrence of an excessive initialization voltage is prevented and thus an increase of bias stress is addressed.

In an embodiment of the present disclosure, there is provided an electroluminescent display device including a display panel, a power supply unit, and a data driver. The display panel includes a subpixel for displaying an image. The power supply unit supplies a positive voltage and a negative voltage to the display panel. The data driver supplies a first initialization voltage and a second initialization voltage to the display panel, as well as a data voltage, and at least one of the first initialization voltage and the second initialization voltage is varied.

At least one of the first initialization voltage generator and the second initialization voltage generator may receive the negative voltage output from the power supply unit.

The second initialization voltage generator may receive the negative voltage output from the power supply unit, and vary the second initialization voltage with reference to the negative voltage.

The first initialization voltage may be applied to a gate electrode of a driving transistor included in the subpixel, and the second initialization voltage may be applied to an anode electrode of an Organic Light Emitting Diode (OLED) included in the subpixel.

The first initialization voltage may have a fixed voltage value, and the second initialization voltage may be varied while maintaining a variation value corresponding to change in the negative voltage, wherein the second initialization voltage is varied within a voltage range lower than a threshold voltage of the OLED.

The subpixel may include a first initialization transistor configured to operate to apply the first initialization voltage to a gate electrode of a driving transistor, and a second initialization transistor configured to operate to apply the second initialization voltage to an node electrode of an OLED.

At least one of the first initialization voltage generator and the second initialization voltage generator may be included in a data driver that supplies a data voltage to the display panel.

The second initialization voltage generator may include: an output unit configured to output a second initialization voltage based on a voltage between a first power terminal and a second power terminal; a voltage selector configured to output one of variation values consisting of voltage values lower than a threshold voltage of an OLED; an amplifier configured to control outputting of the output unit based on a variation value output from the voltage selector and the received negative voltage; and first to fourth resistors configured to divide voltages input via input terminals of the amplifier.

The output unit may include a first electrode connected to a first power terminal, a second electrode connected to an output terminal of the second initialization voltage generator, and a gate electrode connected to an output terminal of the amplifier; the first resistor may include one end connected to a second electrode of the output unit and the output terminal of the second initialization voltage; and the other end connected to the second resistor terminal; the second resistor may include one end connected to the other end of the first resistor, and the other end connected to a second power terminal; the third resistor may include one end connected to an output terminal of the voltage selector, and the other end connected to a first input terminal of the amplifier; the fourth resistor may include one end connected to the other end of the third resistor and the first input terminal of the amplifier, and the other end connected to a negative voltage line to which the negative voltage; and the amplifier may include the first input terminal connected between the third resistor and the fourth resistor, a second input terminal connected between the first resistor and the second resistor, and the output terminal connected to the gate electrode of the output unit.

The first resistor may have a resistance ratio identical to a resistance ratio of the second resistor, and the third resistor may have a resistance ratio identical to a resistor ratio of the fourth resistor.

In another embodiment of the present disclosure, there is provided a method for driving an electroluminescent display device. The method includes: initializing a gate electrode of a driving transistor by applying a first initialization voltage for a initialization period of a display panel; and initializing an anode electrode of an Organic Light Emitting Diode (OLED) by applying a second initialization voltage for the initialization period, wherein the first initialization voltage is fixed, and the second initialization voltage is variable.

The initializing of an anode electrode may include varying the second initialization voltage to correspond to change in a negative voltage output from a power supply unit.

Advantageous Effects of Invention

The present disclosure is able to form a voltage difference as much as required for initializing the OLED so that occurrence of an excessive initialization voltage is prevented and thus an increase of bias stress is addressed. In addition, the present disclosure is able to address change of properties of a display panel caused by temperature change to restrain unnecessary bias stress from occurring and therefore enhancing a device life and a display quality. Furthermore, the present disclosure is able to improve a threshold-voltage sensing time and a threshold-voltage sensing accuracy when a threshold voltage is sampled.

BRIEF DESCRIPTION OF DRAWINGS

The accompany drawings, which are included to provide a further understanding of the disclosure and are incorporated on and constitute a part of this specification illustrate embodiments of the disclosure and together with the description serve to explain the principles of the disclosure.

FIG. 3 is a schematic block diagram illustrating some configuration of an organic light-emitting display according to an embodiment of the present disclosure.

FIG. 4 is a circuit diagram illustrating some configuration of a subpixel according to an embodiment of the present disclosure.

FIG. 5 is a circuit diagram illustrating a second initialization voltage generator according to an embodiment of the present disclosure.

FIG. 6 is a circuit diagram illustrating a 7T1C-based subpixel according to the test example.

FIG. 7 is a circuit diagram illustrating a 7T1C-based subpixel according to an embodiment of the present disclosure.

FIG. 8 shows a simulation results regarding outputting a second initialization voltage according to an embodiment of the present disclosure.

FIG. 9 shows a simulation result regarding compensation for a deviation according to an embodiment of the present disclosure.

FIG. 10 shows a simulation result regarding pixel holding ratio properties according to an embodiment of the present disclosure.

MODE FOR THE INVENTION

Reference will now be made in detail embodiments of the disclosure examples of which are illustrated in the accompanying drawings.

Hereinafter, detailed description of the embodiments will be provided with reference to the accompanying drawings.

In the following description, an electroluminescent display device may be implemented as a TV, a video player, a personal computer (PC), a home theater, a smart phone, a virtual reality (VR) device, or the like. In addition, the electroluminescent display device described in the following will be exemplified by an organic light-emitting display that is implemented based on an Organic Light Emitting Diode (OLED) (light emitting device). However, the electroluminescent display device described in the following may be implemented by an inorganic light emitting diode.

In the following description, electrodes of Thin Film Transistors (TFTs) of the electroluminescent display device may be referred to as a source electrode and a drain electrode or a drain electrode and a source electrode, except a gate electrode, according to a type of the TFT, so, in order to avoid this limitation, they are indicated as a first electrode and a second electrode. In addition, in the following description, transistors included in subpixels are described as being implemented as P type.

Figure 1:
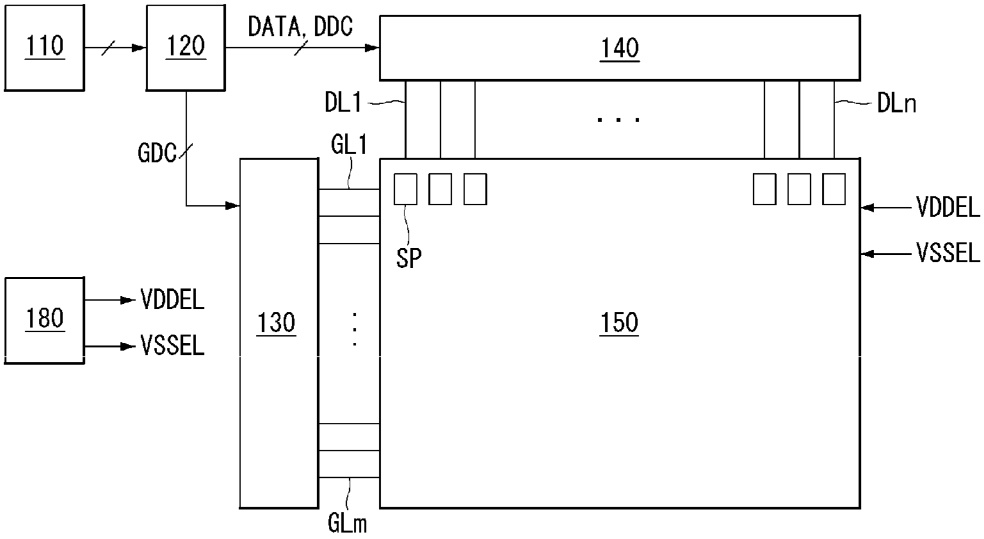
FIG. 1 is a schematic block diagram illustrating an organic light-emitting display device

FIG. 1 is a schematic block diagram illustrating an organic light-emitting display device As illustrated in FIG. 1, the organic light-emitting display includes an image processing unit 110, a timing controller 120, a data driver 130, a scan driver 140, a display panel 150, and a power supply unit 180.

The image processing unit 110 outputs a data enable signal DE as well as a data signal DATA supplied from the outside. Besides the data enable signal DE, the image processing unit 110 may output at least one of a vertical synchronization signal, a horizontal synchronization signal, and a clock signal, but these signals are omitted in the drawings for convenience of explanation.

The timing controller 120 receives the supply of a data signal DATA as well as a driving signal, which includes a data enable signal DE or a vertical synchronization signal, a horizontal synchronization signal, and a clock signal from the image processor 110, from the image processing unit 110. Based on a driving signal, the timing controller 120 outputs a gate timing control signal GDC for controlling operation timing of the scan driver 140 and a data timing control signal DDC for controlling operation timing of the data driver 130.

The data driver 130 samples and latches a data signal DATA supplied from the timing controller 120 in response to a data timing control signal DDC supplied from the timing controller 120, converts the data signal DATA to a gamma reference voltage, and outputs the gamma reference voltage. The data driver 130 outputs a data signal DATA through data lines DL1-DLn. The data driver 130 is in the form of an Integrated Circuit (IC).

The scan driver 140 outputs a scan signal while shifting a level of a gate voltage in response to a gate timing control signal GDC supplied from the timing controller 120. The scan driver 140 outputs a scan signal through scan lines GL1-GLm. The scan driver 140 is in the form of an Integrated Circuit (IC) or is formed in a Gate In Panel (GIP) structure on the display panel 150.

The power supply unit 180 outputs a positive voltage and a negative voltage. The power supply unit 180 includes a positive voltage output terminal for outputting a positive voltage, and a negative voltage output terminal for outputting a negative voltage. The positive voltage output terminal is connected to a positive voltage line VDDEL, and the negative voltage output unit is connected to a negative voltage line VSSEL. A positive voltage and a negative voltage are supplied from the power supply unit 180 to the display panel 150 via the positive voltage line VDDEL and the negative voltage line VSSEL.

The display panel 150 displays an image in response to a data signal DATA supplied from the data driver 130, a scan signal supplied from the scan driver 140, and a voltage output from the power supply unit 180. The display panel 150 includes subpixels SP which operate to display an image.

The subpixels SP include a red subpixel, a green subpixel, and a blue subpixel or include a white subpixel, a red subpixel, a green subpixel, and a blue subpixel. The subpixels SP may have at least one different emitting area according to a light emitting characteristic.

Each of the subpixels SP includes: a switching transistor performing a switching operation to store a data voltage in a capacitor; a driving transistor generating a driving current in response to a data voltage stored in the capacitor; and an OLED emitting light in response to the driving current. As such, the structure of driving the organic light emitting diode based on two transistors and one capacitor is called 2T(Transistor)1C(Capacitor).

Recently, there have been proposed various forms of compensation transistors to compensate for a threshold voltage variation of the driving transistor or the OLED occurring in the basic circuit, such as a 2T1C circuit, and various forms of a compensation circuits based on an initialization voltage different from the data voltage.

The inventor of the present disclosure has investigated one of test examples in which a compensation circuit is applied, and proposes the following embodiment which is capable of solving the problem of the investigated test example.

Figure 2:
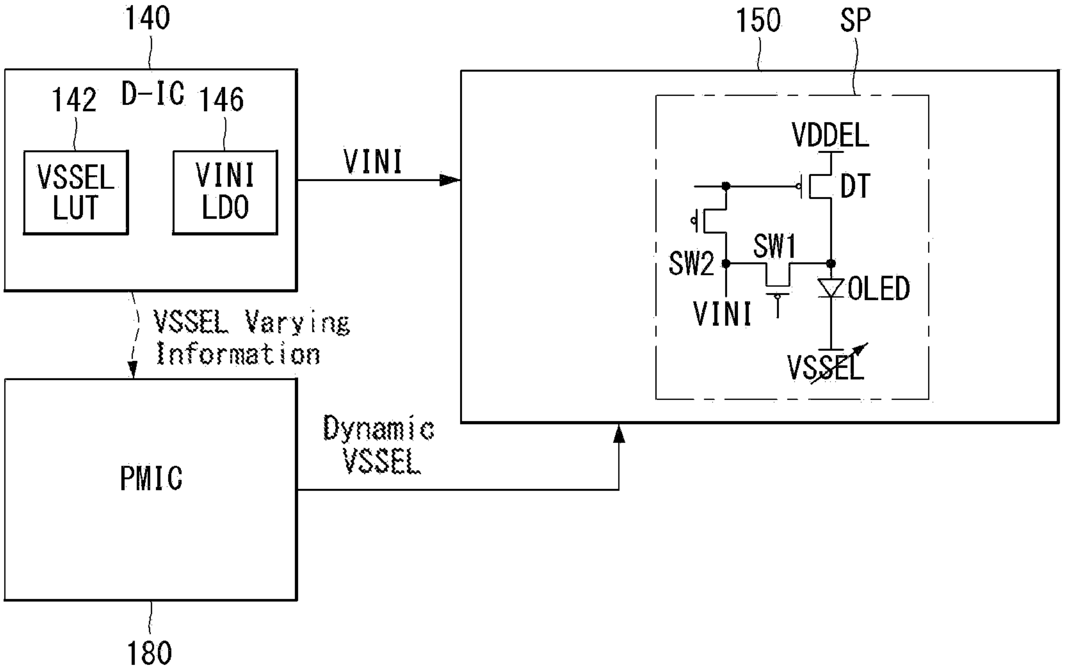
FIG. 2 is a schematic block diagram illustrating some configuration of the organic light-emitting display according to a test example.

FIG. 2 is a schematic block diagram illustrating some configuration of the organic light-emitting display according to a test example.

As illustrated in FIG. 2, a subpixel SP included in the display panel 150 includes a driving transistor DT, a first switching transistor SW1, a second switching transistor SW2, and an OLED. The configuration of the subpixel SP may vary depending on configuration of a compensation circuit, and only parts related to the text example are shown.

A source electrode of the driving transistor DT is connected to the positive voltage line VDDEL to be applied with a positive voltage, and a cathode electrode of the OLED is connected to the negative voltage line VSSEL to be applied with a negative voltage. The first switching transistor SW1 is provided between a drain electrode of the driving transistor DT and an initialization voltage line VINI. The second switching transistor SW2 is provided between a gate electrode of the driving transistor DT and the initialization voltage line VINI.

The first switching transistor SW1 applies an initialization voltage, which corresponds to a negative voltage, in order to prevent operation either or both of the driving transistor DT and the OLED for an initialization period (a period for applying an initialization voltage) and a compensation period (a period for compensating for a threshold voltage) of the subpixel SP. In this case, the initialization voltage may be set to be a voltage at which the OLED is able to be completely (sufficiently) turned off, that is, a voltage lower than a threshold voltage of the OLED.

The data driver 140 includes a lookup table 142 and an initialization voltage generator 146. The data driver 140 further includes a data voltage output unit, a temperature sensor, and the like, but these are general circuit components and thus not shown in the drawing.

The data driver 140 configured ad above output an initialization voltage capable of initializing a subpixel SP included in the display panel 150, as well as a data voltage. The initialization voltage output from the data driver 140 is transferred to electrodes of the first switching transistor SW1 and the second switching transistor SW2 via the initialization voltage line VINI.

The data driver 140 measure temperature of an exterior environment of the device using an internal temperature sensor, and outputs a negative voltage varying signal (VSSEL varying information) based on data provided in the lookup table 142 (negative voltage variation values corresponding to temperature conditions) in order to vary a negative voltage.

The power supply unit 180 dynamically vary (dynamic VSSEL) the negative voltage, which is to be output to the display panel 150, based on the negative voltage varying signal (VSSEL varying information) output from the data driver 140.

As described above, in the test example, an initialization voltage needs to be set by considering a negative voltage, so that a voltage to be applied to an anode electrode and a cathode electrode of the OLED to be lower than a threshold voltage. However, regardless of change in the negative voltage, a fixed initialization voltage is applied and this may lead to a problem which will be described in the following.

FIG. 3 is a schematic block diagram illustrating some configuration of an organic light-emitting display according to an embodiment of the present disclosure, FIG. 4 is a circuit diagram illustrating some configuration of a subpixel according to an embodiment of the present disclosure, and FIG. 5 is a circuit diagram illustrating a second initialization voltage generator according to an embodiment of the present disclosure.

As illustrated in FIG. 3, the data driver includes the lookup table 142, a first initialization voltage generator 146, and a second initialization voltage generator 148. The data driver 140 further includes a data voltage output unit, a temperature sensor, and the like, but these are general circuit components and thus not shown in the drawing.

The lookup table 142 has data related to negative voltage variants corresponding to temperature conditions. If a negative voltage is varied based on the data stored in the lookup table 142, it is possible to solve the problem that properties of a display panel is changed (luminance change) by temperature.

The first initialization voltage generator 146 and the second initialization voltage generator 148 generate a first initialization voltage and a second initialization voltage, respectively, based on a voltage regulator (low-dropout (LDO)). The first initialization voltage and the second initialization voltage may be generated at the same level or different levels.

The first initialization voltage generator 146 may output a first initialization voltage via a first initialization voltage line VINI1. The second initialization voltage generator 148 generates a second initialization voltage via a second initialization voltage lien VINI2. The first initialization voltage line VINI1 and the second initialization voltage lien VINI2 are connected to every subpixel SP included in the display panel 150.

The data driver 140 configured ad above output the first and second initialization voltages capable of initializing subpixels SP included in the display panel 150, as well as a data voltage. The first initialization voltage and the second initialization voltage output from the data driver 140 may be applied to every subpixel SP included in the display panel 150.

The data driver 140 measures temperature of an exterior environment of the device using an internal temperature sensor, and outputs a negative voltage varying signal (VSSEL varying information) based on data provided in the lookup table 142 (negative voltage variation values corresponding to temperature conditions) in order to change a negative voltage.

The power supply unit 180 dynamically vary (dynamic VSSEL) a negative voltage, which is to be output to the display panel 150, based on the negative voltage varying signal (VSSEL variant information) output from the data driver 140.

Meanwhile, the first initialization voltage generator 146 outputs the first initialization voltage as a fixed voltage value, and the second initialization voltage generator 148 outputs the second initialization voltage as a variable voltage value. To this end, the second initialization voltage generator 148 receives feedback of a negative voltage output from the power supply unit 180, and vary the second initialization voltage with reference to the negative voltage.

As illustrated in FIGS. 3 and 4, a subpixel included in the display panel 150 includes a driving transistor DT, a first switching transistor SW1, a second switching transistor SW2, and an OLED. Configuration of the subpixel SP may vary depending on configuration of a compensation circuit, and only parts related to an embodiment of the present disclosure are shown in the drawings.

A source electrode of the driving transistor DT is connected to the positive voltage line VDDEL to be applied with a positive voltage, and a cathode electrode of the OLED is connected to the negative voltage line VSSEL to be applied with a negative voltage. The first switching transistor SW1 is provided between a drain electrode of the driving transistor DT and an initialization voltage line VINI. The second switching transistor SW2 is provided between a gate electrode of the driving transistor DT and the initialization voltage line VINI.

The first switching transistor SW1 and the second switching transistors SW2 apply an initialization voltage, which corresponds to a negative voltage, in order to prevent operation either or both of the driving transistor DT and the OLED for an initialization period and a compensation period of the subpixel SP. In this case, the initialization voltage may be set to be a voltage at which the OLED is able to be sufficiently turned off.

The first switching transistor SW1 applies a second initialization voltage, which is transferred via the second initialization voltage line VINI2, to a second node Node2. The second switching transistor SW2 applies a first initialization voltage, which is transferred via the first initialization voltage line VINI1, to a first node Node1.

As described above, the second initialization voltage has a varied voltage value, and the first initialization voltage has a fixed voltage value. In particular, the second initialization voltage is varied based on a negative voltage which is feedback, and this may be expressed as an equation "VSSEL−ΔV". In this equation, ΔV is varied by characteristics of the OLED.

It is desirable that ΔV is set to be a voltage value within a voltage range lower than a threshold voltage of the OLED. It is because the OLED is initialized by both ends, that is, the second initialization voltage and the negative voltage, and thus, if the second initialization voltage is output based on "VINI2=VSSEL−ΔV", initialization can be done even using a voltage necessary for initializing the OLED (a voltage capable of completely turning off the OLED).

As illustrated in FIG. 5, an output terminal Vout of the second initialization generator 148 is connected to the second initialization voltage line VINI2. The second initialization voltage generator 148 may output the second initialization voltage by varying the second initialization voltage based on a negative voltage which is feedback. The second initialization voltage generator 148 includes a voltage selector SEL, an amplifier AMP, an output unit TR, and resistors R1 to R4.

The voltage selector SEL has variation values ΔV consisting of voltage values lower than the threshold voltage of the OLED. The voltage selector SEL outputs one of the variation values ΔV in response to a resistance value VINI2_Reg. The resistance value VINI2_Reg may be binary numbers consisting of specific values from among 000~111, but aspects of the present disclosure are not limited thereto.

A first electrode of the output unit TR is connected to a first Positive Power Rail (RRP), a second electrode of the output unit TR is connected to the output terminal Vout of the second initialization voltage generator 148, and a gate electrode of the output unit TF is connected to an output terminal o of the amplifier AMP. A positive voltage is applied to the first PPR.

One end of a first resistor R1 is connected to a second electrode of the output unit TR and the output terminal Vout of the second initialization voltage generator 148, and the other end of the first resistor R1 is connected to one end of a second resistor R2. One end of the second resistor R2 is connected to the other end of the first resistor R1, and the other end of the second resistor R2 is connected to a second Negative Power Rail (NPR). A negative voltage is applied to the second NPR.

One end of a third resistor R3 is connected to the output terminal of the voltage selector SEL, and the other end of the third resistor R3 is connected to a first input terminal (+) of the amplifier AMP. One end of a fourth resistor R4 is connected to the other end of the third resistor R3 and the first input terminal (+) of the amplifier AMP, and the other end of the fourth resistor R4 is connected to the negative voltage line VSSEL The fourth resistor R4 is connected to the negative voltage line VSSEL, but desirably connected close to the negative output terminal of the power supply unit in order to reduce noise and provide feedback of an accurate negative voltage.

A first input terminal (+) of the amplifier AMP is connected to a node to which the other end of the third resistor R3 and one end of the fourth resistor R4 are connected to each other or at which the other end of the third resistor R3 and one end of the fourth resistor R4 meet each other. A second input terminal (−) of the amplifier AMP is connected to a node to which the other end of the first resistor R1 and one end of the second resistor R2 are connected to each other or at which the other end of the first resistor R1 and one end of the second resistor R2 meet each other. The output terminal o of the amplifier AMP is connected to the output unit TR.

The third resistor R3 and the fourth resistor R4 provided in the first input terminal (+) of the amplifier AMP have the same resistance ratio. When the third resistor R3 and the fourth resistor R4 have the same resistance ratio, an input voltage to the first input terminal (+) of the amplifier AMP may form a condition such as "Vin=(VSSEL−ΔV)/2" by the resistor ratios of R3 and R4.

The first resistor R1 and the second resistor R2 provided in the second input terminal (−) of the amplifier AMP have the same resistor ratio. When the first resistor R1 and the second resistor R2 have the same resistance ratio, an output voltage from the output terminal Vout of the amplifier AMP may be "Vout=Vin*(1+R1/R2)".

As the first to fourth resistors R1 to R4 dividing voltages input via input terminals of the amplifiers AMP have the same resistance ratio, voltage values formed at both ends are substituted and accordingly the final output voltage from the second initialization voltage generator 148 is expressed as an equation "Vout=VSSEL−ΔV". When this equation is expressed in the form of a second initialization voltage, it is "VINI2=VSSEL−ΔV".

Meanwhile, the above description is about an example in which the first and second initialization voltage generators 146 and 148 are included in the data driver 140, but it is merely exemplary and at least one of the first and second initialization voltage generators may be separated as a device independent of the data driver 140.

Hereinafter, differences between the text example and an embodiment of the present disclosure will be described based on a subpixel in the test example and the embodiment of the present disclosure. Each subpixel for the test example and the embodiment of the present disclosure is configured in the form of 7T1C for voltage compensation in order to compare the test example and the embodiment, but aspects of the present disclosure are not limited thereto and may be applied to a method for applying an initialization voltage.

FIG. 6 is a circuit diagram illustrating a 7T1C-based subpixel according to the test example, FIG. 7 is a circuit diagram illustrating a 7T1C-based subpixel according to an embodiment of the present disclosure, and FIG. 8 shows a simulation result regarding outputting a second initialization voltage according to an embodiment of the present disclosure.

As illustrated in FIG. 6, a subpixel SP in the test example includes a first transistor T1, a second transistor T2, a third transistor T3, a fourth transistor T4, a fifth transistor T5, a sixth transistor T6, a driving transistor DT, a capacitor Cstg, and an OLED.

The driving transistor DT controls a driving current, which is applied to the OLED in response to a source-gate voltage Vsg. A gate electrode of the driving transistor DT is connected to a node A, a first electrode (source electrode) of the driving transistor DT is connected to a node D, and a second electrode (drain electrode) of the driving transistor DT is connected to a node B.

The first transistor T1 is turned on or off in response to a Nth scan signal. A gate electrode of the first transistor T1 is connected to a Nth scan signal line GL(n), a first electrode of the first transistor T1 is connected to a data line DL, and a second electrode of the first transistor T1 is connected to the node D.

The second transistor T2 is turned on or off in response to a Nth emission signal. A gate electrode of the second transistor T2 is connected to a Nth emission signal line EM(n), a first electrode of the second transistor T2 is connected to a positive voltage line VDDEL, and a second electrode of the second transistor T2 is connected to the node D.

The third transistor T3 is turned on or off in response to the Nth scan signal. A gate electrode of the third transistor T3 is connected to the N0*th* scan signal line GL(n), a first electrode of the third transistor T3 is connected to the node A, and a second electrode of the third transistor T3 is connected to the node B. The third transistor T3 may be called a sampling transistor.

The fourth transistor T4 is turned on and off in response to the Nth emission signal. A gate electrode of the fourth transistor T4 is connected to the Nth emission signal line EM(n), a first electrode of the fourth transistor T4 is connected to the node B, and a second electrode of the fourth transistor T4 is connected to the node C. The fourth transistor T4 may be called an emission transistor.

One end of the capacitor Cstg is connected to the node A, and the other end of the capacitor Cstg is connected to an initialization voltage line VINI. An anode electrode of the OLED is connected to the node C, and a cathode electrode of the OLED is connected to the negative voltage line VSSEL.

The fifth transistor T5 is turned on or off in response to a N-1*th* scan signal line GL(n-1) (a scan signal line at the front end). A gate electrode of the fifth transistor T5 is connected to the N-1*th* scan signal line GL(n-1), a first electrode of the fifth transistor T5 is connected to the node A, and a second electrode of the fifth transistor T5 is connected to the initialization voltage line VINI. The fifth transistor T5 may be called a first initialization transistor.

The sixth transistor T6 is turned on or off in response to the N-1*th* scan signal line GL(n-1) (a scan signal line at the front end). A gate electrode of the sixth transistor T6 is connected to the N-1*th* scan signal line GL(n-1), a first electrode of the sixth transistor T6 is connected to the node C, a second electrode of the sixth transistor is connected to the initialization voltage line VINI. The sixth transistor T6 may be called a second initialization transistor.

In the subpixel SP in the text example, the fifth transistor T5 and the sixth transistor T6 are turned on at the same time. As a result, the equally configured initialization voltage is applied to the node A and the node C. As described above, in the test example, a fixed initialization voltage is applied, regardless of change of a negative voltage. For example, a negative voltage to be applied to the cathode electrode of the OLED has a value which is varied to between −2V and −4V, but an initialization voltage to be applied to the anode electrode of the OLED is fixed to −5V.

A test has been conducted to investigate problems described above, and it is found that an excessive initialization voltage (an initialization voltage which leads to an excessive level difference between VSSEL and VINI) is formed at both ends of the OLED. As such, a circuit applied with an excessive initialized voltage may be under unnecessary bias stress. In addition, if the excessive initialization voltage is formed, it may lead to an increase of power consumption by the device.

As illustrated in FIG. 7, a subpixel SP in an embodiment of the present disclosure includes a first transistor T1, a second transistor T2, a third transistor T3, a fourth transistor T4, a fifth transistor T5, a sixth transistor T6, a driving transistor DT, a capacitor Cstg, and an OLED, The driving transistor DT controls a driving current that is applied to the OLED in response to a source-gate voltage Vsg. A gate electrode of the driving transistor is connected to a node A, a first electrode (source electrode) of the driving transistor DT is connected to a node D, and a second electrode (drain electrode) of the driving transistor DT is connected to a node B.

The first transistor T1 is turned on or off in response to a Nth scan signal. A gate electrode of the first transistor T1 is connected to a Nth scan signal line GL(n), a first electrode of the first transistor T1 is connected to a data line DL, and a second electrode of the first transistor T1 is connected to the node D.

The second transistor T2 is turned on or off in response to a Nth emission signal. A gate electrode of the second transistor T2 is connected to a Nth emission signal line EM(n), a first electrode of the second transistor T2 is connected to a positive voltage line VDDEL, and a second electrode of the second transistor T2 is connected to the node D.

The third transistor is turned on or off in response to the Nth scan signal. A gate electrode of the third transistor T3 is connected to the Nth scan signal line GL(n), a first electrode of the third transistor T3 is connected to the node A, and the second electrode of the third transistor T3 is connected to the node B. The third transistor T3 may be called a sampling transistor.

The fourth transistor T4 is turned on or off in response to the Nth emission signal. A gate electrode of the fourth transistor T4 is connected to the N0*th* emission signal line EM(n), a first electrode of the fourth transistor T4 is connected to the node B, and a second electrode of the fourth transistor T4 is connected to the node C. The fourth transistor T4 may be called an emission transistor.

One end of the capacitor Cstg is connected to the node A, and the other end of the capacitor Cstg is connected to an initialization voltage line VINI. An anode electrode of the OLED is connected to the node C, and a cathode electrode of the OLED is connected to a negative voltage line VSSEL.

The fifth transistor T5 is turned on or off in response to a N-1*th* scan signal line GL(n-1) (a scan signal line at the front end). A gate electrode of the fifth transistor T5 is connected to a N-1*th* scan signal line GL(n-1), a first electrode of the fifth transistor T5 is connected to the node A, and a second electrode of the fifth transistor T5 is connected to a first initialization voltage line VINI. The fifth transistor T5 may be called a first initialization transistor.

The sixth transistor T6 is turned on or off in response to a N-1*th* scan signal line GL(n-1). A gate electrode of the second transistor T6 is connected to the N-1*th* scan signal line GL(n-1), a first electrode of the sixth transistor T6 is connected to the node C, and a second electrode of the sixth transistor T6 is connected to a second initialization voltage line VINI2. The sixth transistor T6 may be called a second initialization transistor.

In the subpixel SP according to the embodiment of the present disclosure, the fifth transistor T5 and the sixth transistor T6 are turned on at the same time but applied with different initialization voltages. As a result, a fixed first initialization voltage is applied to the node A, but a variable second initialization voltage is applied to the node C.

As described above, in the embodiment of the present disclosure, a first initialization voltage, which is fixed to be the same value regardless of change in a negative voltage, is applied. In addition, in the embodiment of the present disclosure, a second initialization voltage VIN2, which is varied in response to change a negative voltage VSSEL, as shown in FIG. 8, is applied. As found in FIG. 8, the second initialization voltage VINI2 is varied while maintaining a variation value ΔV corresponding to the change in the negative voltage VSSEL.

For example, a negative voltage to be applied to the cathode of the OLED has a value which is varied to between −2V and −4V, and a second initialization voltage to be applied to the anode electrode of the OLED has a value which is varied to between −2.5V and −4.5V, and a level difference between the negative voltage and the second initialization voltage is always maintained to be ΔV. In the case where a voltage lower than the threshold voltage of the OLED is −0.5V, the following examples may be possible: (1) if the negative voltage to be applied to the cathode electrode of the OLED is −2V, the second initialization voltage to be applied to the anode electrode is −2.5V; and (2) if the negative voltage to be applied to the cathode electrode of the OLED is −3V, the second initialization voltage to be applied to the anode electrode is −3.5V. Thus, an excessive voltage required for initialization is generated and output in the text example, but a voltage required for initialization is generated and output as efficiently as possible in the embodiment of the present disclosure.

A test has been conducted based on the embodiment of the present disclosure, and a voltage difference as great as a voltage required for initialization of the OLED is formed at both ends of the OLED, and therefore, an initialization voltage (an initialization voltage which leads to an excessive level difference between VSSEL and VINI) is not formed at the both ends of the OLED. Thus, unnecessary bias stress is not increased, and power consumption by the device is not increased. In addition, according to the embodiment of the present disclosure, a voltage level to be applied to the initialization period may be set to be higher than in the text example, so it is possible to further increase a threshold-voltage sensing time and threshold-voltage sensing accuracy when sampling the threshold voltage.

FIG. 9 shows a simulation result regarding compensation for a deviation according to an embodiment of the present disclosure, and FIG. 10 shows a simulation result regarding pixel holding ratio properties according to an embodiment of the present disclosure.

As illustrated in FIGS. 5 to 9, the second initialization voltage generator 148 according to an embodiment of the present disclosure includes a voltage selector SEL capable of selecting one of variation values ΔV. The voltage selector SEL may output one of the variation values ΔV in response to a resistor value VINI2-Reg. Thus, if the variation values ΔV have a deviation compared to a target value, inner trimming may be performed as shown in (a), (b), or (c) in FIG. 9 in Fab Process (manicuring process) and then a deviation caused by the configuration of the IC may be compensated.

FIG. 10 is shows a simulation result regarding pixel holding ratios at 750 nit, 150 nit, and 7 nit. The sample POR (Black) in FIG. 10 is a simulation result obtained from the related art, the sample Case 1 (Red) is a simulation result obtained from the test example, and the samples Case 2 and Case 3 (Blue and Green) are simulation results obtained from the embodiment of the present disclosure.

As illustrated in FIG. 10, a pixel holding ratio improves according to an embodiment of the present disclosure. According to the result of FIG. 10, the embodiment of the present disclosure may bring about an effect of reducing a driving frequency further than in the related art.

As above, the present disclosure is able to form a voltage gap as much as required for initialization of an OLED so that occurrence of an excessive initialization voltage may be prevented and thus an increase of bias stress may be addressed. In addition, the present disclosure is able to address change of properties of a display panel caused by temperature change to restrain unnecessary bias stress from occurring and therefore enhancing a device life and a display quality. Furthermore, the present disclosure is able to improve a threshold-voltage sensing time and a threshold-voltage sensing accuracy when a threshold voltage is sampled.

While the exemplary embodiments of the present disclosure have been described with reference to the accompanying drawings, those skilled in the art will understand that the present disclosure may be carried out in any other specific form without changing the technical spirit or an essential feature thereof. Accordingly, it should be understood that the aforementioned exemplary embodiments are illustrative in all aspects and are not restrictive, and the scope of the present disclosure shall be represented by the claims to be described below, and it should be construed that all of the changes or modified forms induced from the meaning and the scope of the claims, and an equivalent concept thereto are included in the scope of the present disclosure.

The invention claimed is:

1. An electroluminescent display device comprising:

a display panel having a subpixel for displaying an image;

a power supply unit configured to supply a positive voltage and a negative voltage to the display panel;

a first initialization voltage generator configured to supply a first initialization voltage to the display panel; and a second initialization voltage generator configured to supply a second initialization voltage to the display panel, wherein the negative voltage is varied based on information gathered by a temperature sensor, wherein the first initialization voltage generator outputs the first initialization voltage as a fixed voltage value, and wherein the second initialization voltage generator varies the second initialization voltage according to the varied negative voltage.

2. The electroluminescent display device of claim 1, wherein at least one of the first initialization voltage generator and the second initialization voltage generator is configured to receive the negative voltage output from the power supply unit.

3. The electroluminescent display device of claim 2, wherein the second initialization voltage generator is configured to receive the negative voltage output from the power supply unit, and to vary the second initialization voltage with reference to the negative voltage.

4. The electroluminescent display device of claim 1, wherein:

the first initialization voltage is applied to a gate electrode of a driving transistor included in the subpixel; and the second initialization voltage is applied to an anode electrode of an Organic Light Emitting Diode (OLED) included in the subpixel.

5. The electroluminescent display device of claim 4, wherein:

the second initialization voltage is varied while maintaining a variation value corresponding to change in the negative voltage, wherein the second initialization voltage is varied within a voltage range lower than a threshold voltage of the OLED.

6. The electroluminescent display device of claim 4, wherein the subpixel comprises:

a first initialization transistor configured to operate to apply the first initialization voltage to the gate electrode of the driving transistor; and a second initialization transistor configured to operate to apply the second initialization voltage to the anode electrode of the OLED.

7. The electroluminescent display device of claim 1, wherein at least one of the first initialization voltage generator and the second initialization voltage generator is included in a data driver that supplies a data voltage to the display panel.

8. The electroluminescent display device of claim 1, wherein the second initialization voltage generator comprises:

an output unit configured to output a second initialization voltage based on a voltage between a first power terminal and a second power terminal;

a voltage selector configured to output one of variation values, the voltage values being lower than a threshold voltage of an Organic Light Emitting Diode (OLED);

an amplifier configured to control outputting of the output unit based on a variation value output from the voltage selector and the received negative voltage; and first to fourth resistors configured to divide voltages input via input terminals of the amplifier.

9. The electroluminescent display device of claim 8, wherein:

the output unit comprises a first electrode connected to a first power terminal, a second electrode connected to an output terminal of the second initialization voltage generator, and a gate electrode connected to an output terminal of the amplifier;

the first resistor having a first end connected to a second electrode of the output unit and the output terminal of the second initialization voltage, and a second end connected to the second resistance terminal;

the second resistor having a first end connected to the second end of the first resistor, and a second end connected to a second power terminal;

the third resistor having a first end connected to an output terminal of the voltage selector, and a second end connected to a first input terminal of the amplifier;

the fourth resistor having a first end connected to the second end of the third resistor and the first input terminal of the amplifier, and a second end connected to a negative voltage line to which the negative voltage is applied; and the amplifier comprises the first input terminal connected between the third resistor and the fourth resistor, a second input terminal connected between the first resistor and the second resistor, and the output terminal connected to the gate electrode of the output unit.

10. The electroluminescent display device of claim 9, wherein:

the first resistor has a resistance ratio identical to a resistance ratio of the second resistor; and the third resistor has a resistance ratio identical to a resistance ratio of the fourth resistor.

11. A method for driving an electroluminescent display device, comprising:

generating a negative voltage being varied based on information gathered by a temperature sensor;

initializing a gate electrode of a driving transistor by applying a first initialization voltage generated by a first initialization voltage generator for a initialization period of a display panel; and initializing an anode electrode of an Organic Light Emitting Diode (OLED) by applying a second initialization voltage generated by a second initialization voltage generator for the initialization period, wherein the first initialization voltage is fixed, and the second initialization voltage is variable according to the varied negative voltage.

12. The method of claim 11, wherein the initializing of an anode electrode comprises varying the second initialization voltage to correspond to change in a negative voltage output from a power supply unit.

13. The method of claim 11, further comprising:

measuring a temperature of an exterior environment of the electroluminescent display device via the temperature sensor, wherein the temperature sensor is included in a data driver of the electroluminescent display device;

generating a negative voltage varying signal based on an output from a lookup table included in the data driver; and transmitting, via the data driver, a negative voltage varying signal to the power supply unit, wherein the power supply is configured to vary the negative voltage based on the negative voltage varying signal output by the data driver.

14. The electroluminescent display device of claim 1, further comprising:

a data driving configured to supply a data signal to the subpixel, wherein the temperature sensor is included in the data driver, and wherein the data driver further includes a lookup table storing data related to negative voltage variants corresponding to temperature conditions.

15. The electroluminescent display device of claim 14, w the data driver is further configured to:

measure a temperature of an exterior environment of the electroluminescent display device via the temperature sensor, generate a negative voltage varying signal based on an output from the lookup table, and transmit a negative voltage varying signal to the power supply unit, and wherein the power supply is configured to vary the negative voltage based on the negative voltage varying signal output by the data driver.

16. The electroluminescent display device of claim 1, wherein the negative voltage is varied to maintain a constant luminance of the display panel.

17. The electroluminescent display device of claim 1, wherein the second initialization voltage generator includes an amplifier configured to receive the varying negative voltage as an input to the amplifier, and wherein the second initialization voltage, output by the second initialization voltage generator, is varied based on the varying negative voltage input to the amplifier as a feedback input.

* * * * *